DATA REPRODUCING APPARATUS

Filed March 20, 1961 2 Sheets-Sheet 1

INVENTORS
NICHOLAS CURTIS
JOSEPH R. ROBERTELLA
BY Kane, Dalsimer and Kane
ATTORNEYS

DATA REPRODUCING APPARATUS

Filed March 20, 1961 2 Sheets-Sheet 2

INVENTORS
NICHOLAS CURTIS
JOSEPH R. ROBERTELLA
BY Kane, Dalsimer and Kane
ATTORNEYS United States Patent Office 3,108,156
Patented Oct. 22, 1963

3,108,156
DATA REPRODUCING APPARATUS

Nicholas Curtis, Denville, and Joseph Raymond Robertella, North Arlington, N.J., assignors to Trans-Lux Corporation, New York, N.Y., a corporation of Delaware Filed Mar. 20, 1961, Ser. No. 96,862
7 Claims. (Cl. 178—24)

This invention relates to a structurally and functionally improved data reproducing apparatus and especially apparatus by means of which indicia may be displayed at the earliest possible moment after it is imprinted upon a web and a tape of suitable materials.

So displayed and in accordance with the present teachings light images of the indicia upon the tape and web will be produced either by a conventional projection system employing a translucent screen or, for example, a television camera in circuit with a number of receivers and which camera scans the display zone of the imprinted tape and web.

Still another object of the present invention is that of furnishing an apparatus in which the light images may be created very shortly after imprinting has occurred. Therefore, the objectionable delay period ordinarily existing between imprinting and display of the indicia will be avoided.

Among other objects of the invention are those of providing an extremely simple layout of apparatus which will include relatively few parts capable of being readily serviced when required and in which the mechanism will function over long periods of time with freedom from all difficulties.

With these and other objects in mind reference is had to the attached sheets of drawings illustrating practical embodiments of the invention and in which.

Figure 1:
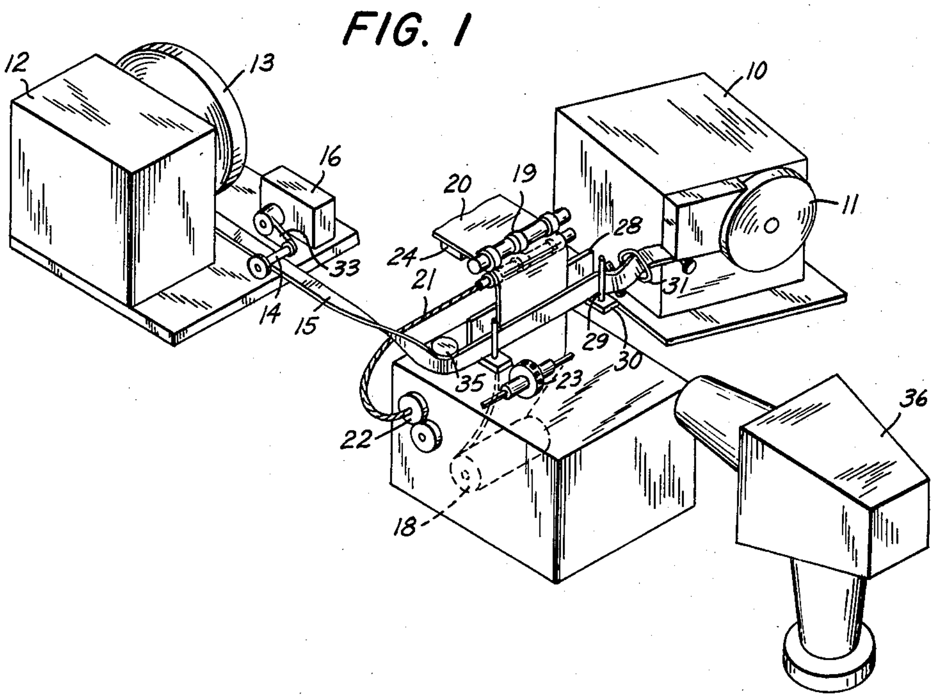
FIG. 1 is a perspective view of one desirable layout of apparatus.

Referring primarily to FIG. 1, the numeral 10 indicates a suitable casing which supports a roll 11 of tape. Within this casing there is a desirable type of tape imprinting mechanism such as is, for example, employed in a stock ticker machine. The numeral 12 again indicates a casing within which there is disposed a motor serving to drive a take-up reel 13 or other suitable unit for drawing the tape 15 from the supply roll 11. The operation of the motor is controlled by a suitable switch or resistance-switch within casing 16 by means of an actuator 14. The latter, as illustrated, rides against the surface of the tape. If the motor within casing 12 is not operating at a sufficiently high speed, then tape 15 will begin to form a loop resulting in the actuator moving downwardly. This will either increase the speed of the motor to an extent such that the tape will extend in a substantially straight condition or—if no resistance is included in unit 16—start the motor to thereby eliminate any sagging in the tape. As is well understood in the latter connection, a slip-coupling or clutch may be provided between the motor drive and the reel 13 or other tape-drawing unit.

Interposed between casings 10 and 12 is a further casing

17. This in common with casing 10 may involve a housing structure, parts of which are removable so that access may be gained to the enclosed mechanism for servicing purposes. Within this latter casing or adjacent thereto a supply of web material conveniently in the form of a roll 18 is disposed. This web moves upwardly from casing 17 under the influence of a pair of cooperating rollers 19 which engage its opposite faces so that its body 20 moves from the casing to a point past these rollers as they are turned. To effect such turning a torque cable 21 may be connected with one of the rollers. Spring or gravity expedients (not shown) may assure frictional engagement between the web 20 and the rollers. Therefore, if the torque cable or its equivalent is rotated, the web will be moved upwardly.

Figure 2:
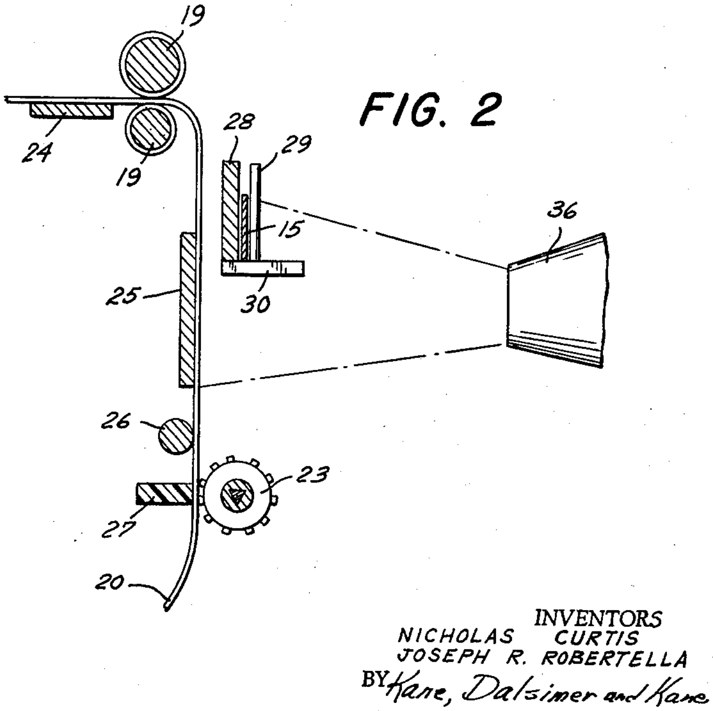
FIG. 2 is a sectional side view of the components providing the display zone for the apparatus.

To effect this result, that end of cable 21 not connected to the roller of pair 19 is coupled to a rotatable unit 22. The mechanism within or associated with casing 17 is of the "Dow-Jones" type. As such, it includes a platen feed gear. The latter is coupled to unit 22 for the purpose of rotating the cable 21 or otherwise driving rollers 19. It is preferred to employ such a cable in that this will simplify servicing problems as casing 17 is opened. A printing wheel 23 forms a part of this mechanism and in accordance with conventional technique serves to imprint indicia characters upon the face of web 20 in the form of successive lines one above the other. This, of course, is in contrast with the indicia characters imprinted upon tape 15 which will extend longitudinally of the latter. As shown in FIG. 1, the tape extends across the face of web 20. At and below this zone of overlap a display zone or station, as shown in FIG. 2, is present.

To guide and support web 20 at a point beyond rollers 19 a plate or apron 24 is conveniently provided. Also, the rear face of this web within the area of the display zone may move over a backing plate 25. A guiding roller 26 is preferably furnished immediately below the display station and above the printing wheel 23 which at this point cooperates with a suitable platen 27. As shown, the tape 15 is conveniently displayed in a proper manner by having it moved through a guide which will embrace a backing plate 28 forwardly of which pins 29 are supported by means of arms 30. Between these pins and the plate a space exists adequate for the free passage of tape 15 across the display zone common to it and the web.

Figures 3, 4:
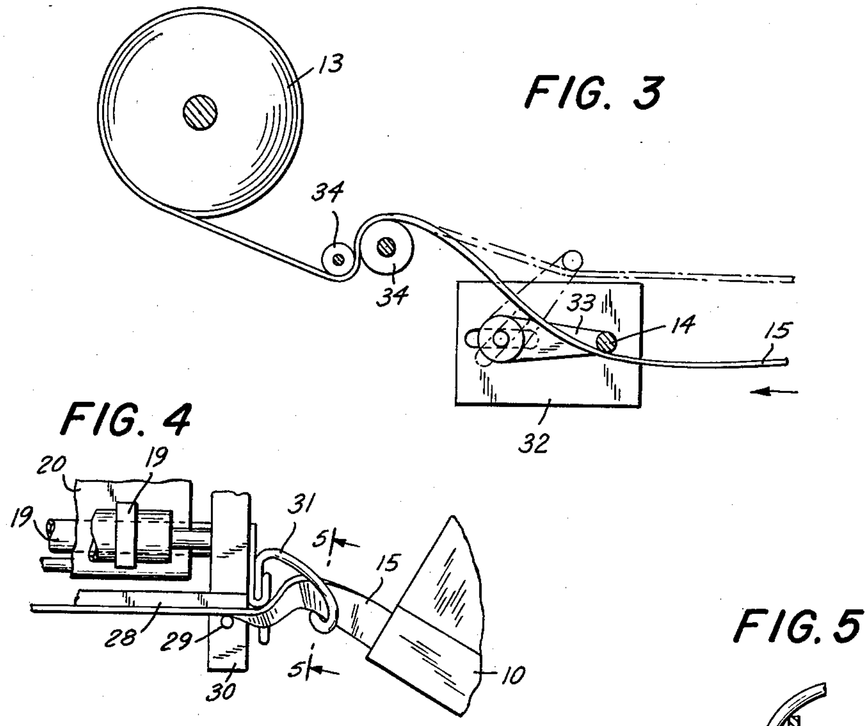
FIG. 3 is a side view, partly in section, of a detail of mechanism preferably forming a part of the assembly.
FIG. 4 is a fragmentary front view of certain of the elements positioned adjacent the display zone
Figure 5:
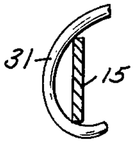
FIG. 5 is a transverse sectional view taken along the line 5—5 in the direction of the arrows as indicated in FIG. 4.

Casing 10 is disposed immediately adjacent casing 17. In order to assure that a minimum zone of travel of tape will exist before the indicia imprinted thereon is within the area of the display zone, it is preferred to employ a loop 31 of the type especially shown in FIGS. 4 and 5. This will guide the tape as it emerges from the imprinting mechanism of casing 10 in a horizontal position to occupy a vertical position properly disposed in the viewing zone. As will also be seen in FIG. 3, the control mechanism for the motor within casing 12 (not shown) may take the form of a switch and/or variable resistance within the housing 32 and controlled by an actuator or arm 33 to assume the position shown either in full or dotted lines in that figure according to whether a tape incorporates a loop or downwardly extending portion, or extends substantially horizontally. As is also shown in this view cooperating friction rollers 34 may be driven by the motor to engage and draw the tape from unit 10 through loop 31, past plate 28 and guide pins 29, around guide member 35 and so to the roll 13 or other final disposition of this tape. With this arrangement of parts it is apparent that the characters imprinted on both the tape and web will extend in the same direction throughout the viewing station.

Figure 6:
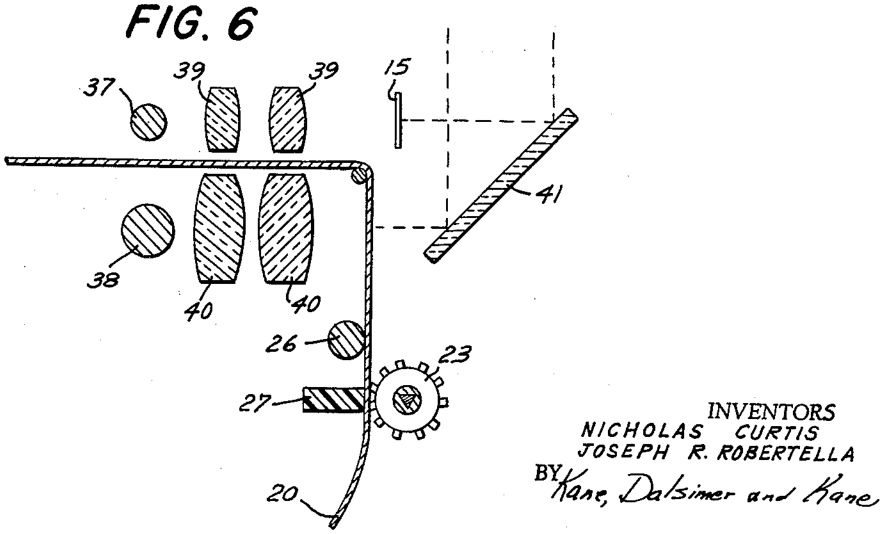
FIG. 6 is a view similar to FIG. 2 but showing the manner in which light images may be created by a projection system.

At that viewing station light images are created. As shown in FIGS. 1 and 2, this reproduction may be by means of a television camera indicated at 36. A suitable source of illumination (not shown) would, of course, serve to illuminate the faces of both the tape and web at this station. The camera would be connected in closed circuit with a series of receivers, as taught, for example, in United States Patent 2,946,849 of July 26, 1960. If it were desired to employ a projection system working on a translucent screen, then, for example, an arrangement such as is illustrated in FIG. 6 could be used.

In that view the tape is again indicated by the numeral 15 and the web by the numeral 20. Sources of illumination, as at 37 and 38, are provided to the rear of condenser-lens assemblies 39 and 40, respectively. Incidental reflecting and mounting structures have, of course, not been shown in that they are well known to those skilled in the art. Conveniently, a mirror 41 is disposed in advance of the tape and web. In turn, beyond this mirror, a suitable objective lens may be provided. In any event with sources 37 and 38 energized and the tape and web being sufficiently transparent to permit an adequate amount of light rays to pass therethrough, the indicia characters imprinted upon their faces will be projected toward the surface of mirror 41. Thence, they will pass to an objective lens assembly. Of course, if desired, no mirror 41 would be necessary. However, in a position beyond the latter assembly either by means of an ordinary or a translucent screen the resultant light images would appear upon a proper viewing surface. These images would present a combination of the indicia appearing upon both the tape and the web with the characters on the different elements being disposed in non-confusing relationship.

Thus, among others, the several objects of the invention as specifically aforenoted are achieved. Obviously, numerous changes in construction and rearrangements of the parts might be resorted to without departing from the spirit of the invention as defined by the claims.

We claim:

1. A data reproducing apparatus including in combination a roller, a web of imprintable material in contact with said roller to be moved thereby in an upward direction, an imprinting machinism for printing horizontal indicia lines on said web, said imprinting mechanism being adjacent said web at a point spaced from and below said roller to provide between the latter and said mechanism a viewing station for the indicia lines horizontally imprinted thereon, a tape, means to each side of said web for positioning said tape to extend transversely across and in superposed relationship with respect to the imprinted face of said web within the zone of the viewing station, means for drawing said tape in one direction across said station with said positioning means serving as a tape guide, means adapted to drive said roller simultaneously with the operation of said tape drawing means, means in advance of said station for horizontally imprinting said tape, whereby the resultant tape indicia extends within the viewing station parallel to the indicia lines imprinted on said web whereby the different indicia on the tape and web may be substantially simultaneously read within the area of the viewing station.

2. In an apparatus as defined in claim 1, said imprinting mechanism being power-driven and the means for driving said roller comprising a mechanical connection between the latter and a moving part of said imprinting mechanism for said web.

3. In an apparatus as defined in claim 1, and means interposed between said tape imprinting means and the first of the positioning means therefor to frictionally engage said tape and exert a drag thereon to cause that tape to extend in a flat condition across the viewing station.

4. In an apparatus as defined in claim 1, the tape emerging from its imprinting mechanism with its body substantially perpendicular to the face of said web within the zone of the printing station and means interposed between the tape imprinting means and the first of said positioning means for causing said tape to extend towards said station with its body parallel to the web face.

5. In an apparatus as defined in claim 1, the tape positioning and guiding means each comprising an arm and pin carried thereby and a backing plate between said arms and spaced from the pins to accommodate a tape therebetween.

6. In an apparatus as defined in claim 1, the tape drawing means comprising a motor operated roller beyond said web, a movable actuator operatively bearing against said tape at a position between said web and roller and a control for said motor connected to said actuator.

7. In an apparatus as defined in claim 1, two lens systems arranged respectively to the rear of said tape and web within the area of the viewing station, said web in its movement away from said station passing between said lens systems, a source of illumination to the rear of said systems and a mirror common to said systems and disposed beyond said viewing station to reflect the composite image of said web and tape.

References Cited in the file of this patent

UNITED STATES PATENTS

| | | |
|---|---|---|
| 1,980,160 | Benjamin et al. | Nov. 13, 1934 |
| 1,992,401 | Steeneck | Feb. 26, 1935 |
| 2,046,697 | Pfannenstiehl | July 7, 1936 |
| 2,252,577 | Newman | Aug. 12, 1941 |
| 2,284,681 | Potts | June 2, 1942 |
| 2,405,173 | Zenner | Aug. 6, 1946 |
| 2,519,004 | Stockfeld | Aug. 15, 1950 |